United States Patent [19]

Maxwell, Jr.

[11] Patent Number: 4,530,509
[45] Date of Patent: Jul. 23, 1985

[54] SLED

[76] Inventor: Joseph A. Maxwell, Jr., 1000 Phillips Knob, Burnsville, N.C. 28714

[21] Appl. No.: 520,943

[22] Filed: Aug. 8, 1983

[51] Int. Cl.³ .............................................. B62B 13/10
[52] U.S. Cl. ........................................ 280/22; 24/457
[58] Field of Search .................. 280/18, 21 R, 22, 28; 24/457

[56] References Cited

U.S. PATENT DOCUMENTS

| D. 196,444 | 10/1963 | Ciborowski | D34/15 |
|---|---|---|---|
| 944,773 | 12/1909 | Clay | 280/22 |
| 949,169 | 2/1910 | Bartelsen | 280/27 |
| 1,066,445 | 7/1913 | Beardsley | 280/22 X |
| 2,027,128 | 1/1936 | Tessmer | 280/22 |
| 2,037,076 | 4/1936 | Kidder | 280/22 |
| 2,499,639 | 3/1950 | Forseth | 280/22 |
| 3,348,247 | 10/1976 | Flannigan | 280/12 R X |
| 3,739,458 | 6/1973 | Reedy et al. | 280/28 X |
| 4,168,843 | 9/1979 | Hager | 280/21 R |

*Primary Examiner*—Joseph F. Peters, Jr.
*Assistant Examiner*—Michael Mar
*Attorney, Agent, or Firm*—J. Rodgers Lunsford; Dale Lischer; William R. Cohrs

[57] ABSTRACT

A sled having a planar platform with tubular runners mounted for pivoting and sliding at points fore and aft of the platform. Because the runners can pivot and slide at the fore and aft points, the entire length of the runner can be bowed for increased maneuverability. The runners are of low friction plastic tubing for speed and are mounted by means of clips which allow for sliding, pivoting, and easy replacement of the runners.

2 Claims, 6 Drawing Figures

SLED

BACKGROUND OF THE INVENTION

This invention relates generally to sleds and more particularly to an improved sled that is highly maneuverable, works in a variety of snow conditions, and is easily repaired and maintained.

Recreational snow sleds are of basically two types. Toboggan sleds are used for deep fine snow, and runner sleds are used for hard packed snow. Toboggan sleds have a flat body which can plane onto and pack fine deep snow. Toboggans are steered by the riders simply leaning in the direction they wish to go in order to cause the sled to tip in that direction and thus plane the snow to create the lateral turning forces on the flat bottom comparable to that of an air foil. As a result, toboggan sleds lack precise steering control, and especially on hard packed snow steering control is almost nonexistent.

Runner sleds on the other hand, are steered by flexing or turning portions of the runners in the direction that the rider wishes to go. The runners, like a rudder on a boat cut into the snow and provide lateral forces which produce the desired turn. In deep fine snow the runners may simply cut through the snow and run aground. Even under ideal snow conditions, most runner sleds provide only limited maneuverability in that only a few inches of the runner near the front of the sled are actually flexed into an arc because the runners are rigidly attached to the sled body.

In addition to varying conditions of snow cover, there may be bare spots in a sled run where there is no snow cover at all. If a toboggan sled encounters such a bare spot, the wooden body of the sled is especially prone to damage from sliding on bare dirt, gravel, or rocks. While runner sleds are not particularly damaged by sliding on bare spots, the increased friction of the bare spots on the metal runners can result in sudden and dangerous stops.

SUMMARY OF THE INVENTION

It is an object of the present invention then to provide a recreational snow sled that is fast, is highly maneuverable, can operate in all snow conditions, and is easily maintained and repaired.

It is an object of the present invention to provide a sled comprising a planar sled platform with tubular, low friction runners pivotally and slidably mounted directly to the bottom of the sled platform.

It is a related object of the present invention to provide runners that are pivotally and slidably mounted at two points so that when each runner is displaced laterally at one end, the runner bows along its entire length thereby providing a high degree of maneuverability.

It is moreover an object of the present invention to provide a sled with a platform having an upturned leading edge for planing and packing deep fine snow.

It is also an object of the present invention to provide a center runner underneath the sled platform to provide additional protection for the sled platform.

It is an ancillary object of the present invention to provide tubular plastic runners which allow easy flexibility for maneuverability and which have a low coefficient of friction against many surfaces to insure speed.

It is an object of the present invention to povide unique runner clips which allow the runners to pivot and slide with respect to the sled platform and which facilitate easy removal and replacement of the runners.

DETAILED DESCRIPTION OF THE INVENTION

While the invention will be described in connection with the preferred embodiment, it will be understood that I do not intend to limit the invention to that embodiment. On the contrary, I intend to cover all alternatives, modifications, and equivalents as may be included within the spirit and scope of the invention as defined by the appended claims.

Figure 1:
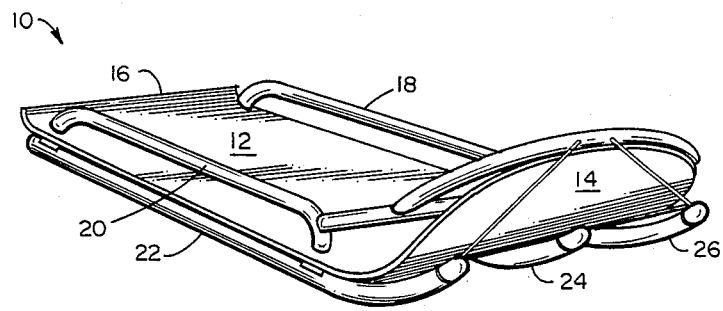
FIG. 1 is a perspective drawing of the sled of the present invention.

Turning to FIG. 1, there is shown a sled 10 having a generally planar fiberglass or molded plywood platform 12 with an upturned front end portion 14. The platform 12 also has an upturned rear portion 16. Side rails 18 and 20 are attached to the platform at positions fore and aft. Runners 22, 24, and 26 are attached to the bottom of the sled. Each runner is made of a hollow tubular material, such as plastic pipe, which is both flexible and has a relatively slippery surface. The runners are each upturned at the forward part of the sled to generally conform to the upturned portion of sled platform 14.

Figure 2:
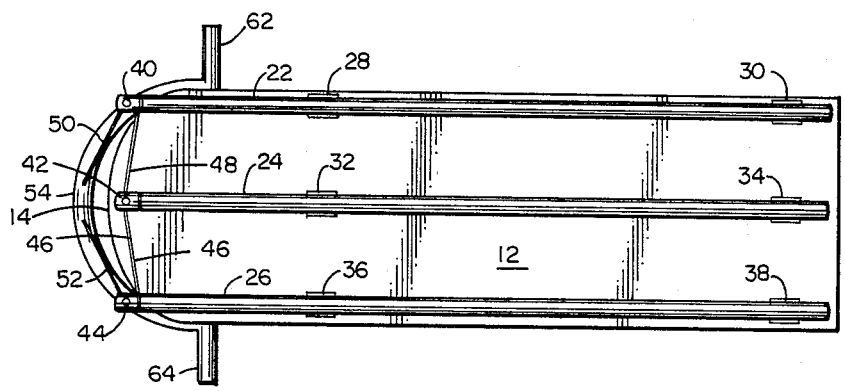
FIG. 2 is a bottom plan view of the sled of the present invention showing the straight forward steering position of the sled runners.

As can best be seen in FIG. 2, the runners 22, 24, and 26 are attached to the bottom of the sled platform at fore and aft points 28, 30, 32, 34, 36, and 38 respectively. The upturned front ends of the runners have caps 40, 42, and 44. The caps are interconnected by a rod having sections 46 and 48, and the end caps 40 and 44 are connected by rods 50 and 52 to semicircular portion 54 of the steering mechanism 56 best shown in FIG. 4.

Figure 4:
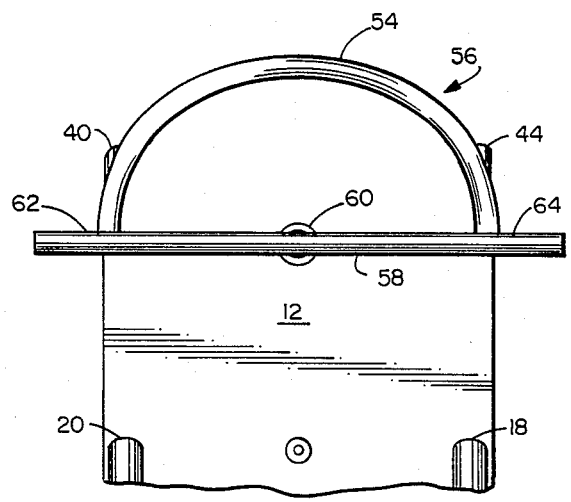
FIG. 4 is partial top plan view of the sled showing the steering mechanism.

Turning to FIG. 4, the steering mechanism 56 comprises steering bar 58 which is pivotedly mounted on the sled platform at a pivot point 60. The semi-circular portion 54 is rigidly attached to the steering bar 58 so that it rotates about pivot point 60 when steering bar 58 is turned by grasping it at its ends 62 and 64.

Figure 3:
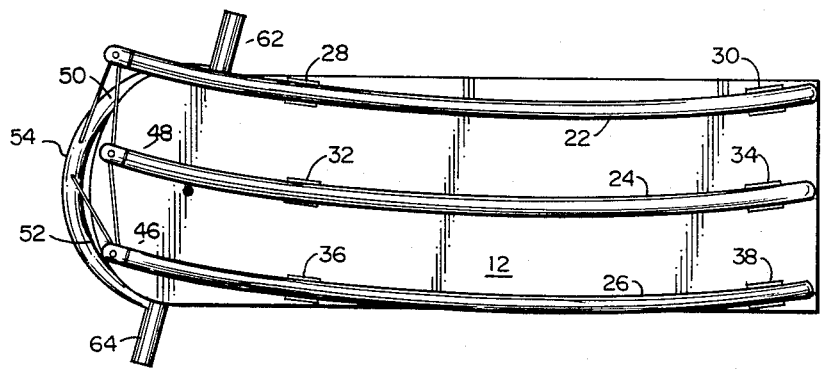
FIG. 3 is a bottom plan view similar to that of FIG. 2 showing the sled runners in their turned position.

When the steering bar 58 is rotated about its pivot point 60, the semi-circular portion 54, by means of connecting rods 50 and 52, causes the ends 40, 42, and 44 of the runners 22, 24, and 26 to move to the left or right (FIGS. 2 and 3).

Turning to FIG. 3, the sled is shown with the fronts of the runners flexed for a left turn in response to the rotation of the steering bar 58 counterclockwise about pivot point 60 (as view from the top of the sled). It should be appreciated that if the runners 22, 24, and 26 are pinned in a stationary fashion at points 28, 30, 32, 34, 36, and 38, the runners 22, 24, and 26 will only flex over the distance between their front end caps 40, 42, and 44 and the points 28, 32, and 36. As a result, only a small portion of the runner is actually used for steering, especially where part of the runner turns up to conform to the upturned portion 14 of the sled platform.

Figure 5:
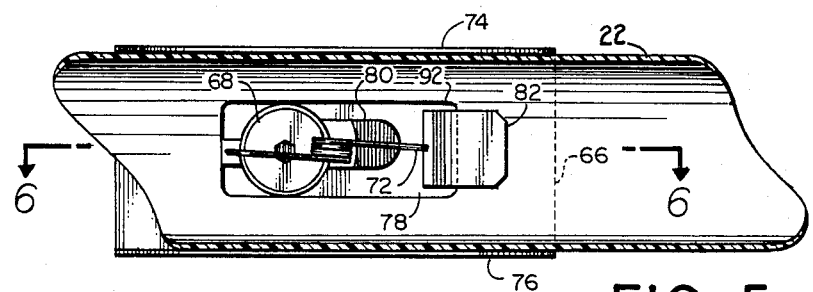
FIG. 5 is a bottom plan view of one of the clips used in attaching the runners to the sled platform (with runner attached.

In order to provide for high maneuverability for the sled, the runners 22, 24, and 26 are connected at points 28, 30, 32, 34, 36, and 38 by means of a clip 66 (FIG. 5) which allows each runner to pivot and to slide longitudinally with respect to the sled platform 12. With the runners thus mounted at mounting points 28, 30, 32, 34, 36, and 38, lateral movement of the front ends 40, 42, and 44 causes the runners to bow over their entire length. In order to allow the runners to bow between the fore and aft pivot points, the runners pivot and slide at the pivot points to accommodate the increased length of the bowed portion of the runners between the fore and aft pivot points. It is this ability of the runners to bow over their entire length that accounts for the improved maneuverability of the sled.

Figure 6:
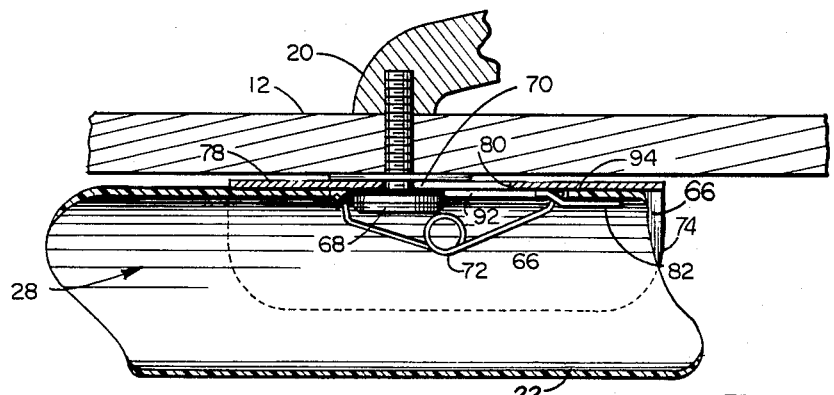
FIG. 6 is a section view of the clip taken along line 6—6 of FIG. 5 (with runner attached).

Turning to FIG. 6, it can be seen that the clip 66 is attached to the sled platform 12 at forward point 28 by means of a screw 68 that extends through the clip and the sled platform. The screw 68 is threaded into the side rail 20 and is tightened against a ferrule 70. The screw 68 also provides a mounting for spring 72. The clip 66 has sides 74 and 76 and a base 78. The base has a slot 80 cut in it and a tongue 82 formed and extending from the base. The mounting screw 68 and ferrule 70 extend through slot 80 thus allowing the clip 66 to slide fore and aft on the ferrule along the length of the slot. The spring 72 urges the clip 66 toward the right (toward the front of the sled for the fore mounted clips and toward the rear of the sled for the aft mounted clips) in FIG. 6.

The tubular plastic runners 22 has an opening 92 which matches and engages the tongue 82 of the clip. In order to attach the runner to the clip, and thus to the sled platform, the clip is urged against the spring so that the tongue can enter the opening 92 in the runner. When the clip is released, the spring urges the clip and tongue forward so that the tongue 82 engages the edge 94 of the opening 92 cut in the runner 22.

As the turning mechanism flexes the runners at their front ends, the bowing of the runner 22 causes the clip 66 to pivot around screw 68 and to slide against the spring 72 to provide the relief that each runner needs in order to accommodate an arc between the fore and aft mounting points.

In addition to providing sliding and pivoting to ensure bowing of the entire runner length, the clip also allows the runners to be mounted in close proximity to the sled platform 12. Thus, in fine deep snow, the large surface area of the bottom of the platform 12 can provide flotation for the entire sled like a toboggan so that the runners do not cut through the snow and run aground. Moreover, the upturned front portion 14 in conjunction with the weight of the sled and riders causes the sled platform to pack the snow and create a surface for the runners to cut into and provide necessary lateral forces required for turning and maneuvering.

The middle runner 24 is attached to the sled platform in order to enhance maneuverability and to protect the bottom of the platform from bare spots and other surface abrasions.

Because the sled runners will eventually wear out from abrasions in the sliding surface, it is important that they can be easily and inexpensively be replaced. The runners themselves are constructed of plastic pipe, which has a low coefficent of friction on many surfaces and is inexpensive. Replacement of the inexpensive plastic runners is facilitated by the unique spring clip arrangements which allows each runner to be removed by simply sliding the clip against the force of the spring 72 and disengaging opening 92 in the runner from the tongue 82 of the clip 66.

I claim:
1. A sled comprising
    (a) a generally planar platform having an upturned front portion;
    (b) tubular runners attached to the platform at fore and aft pivot points, said runners having upturned front portions which extend beyond the fore pivot points, said runners being attached at the fore and aft pivot points by generally U-shaped clip means which are pivotally and slidably mounted to the platform and which partially encircle the tubular runners for providing lateral support, said clip means having a tongue which passes through an opening formed in the runner, said tongue being held in engagement with the opening in the runner by spring means, wherein said runner is connected to said clip means and can be removed from the clip means by flexing the spring means sufficiently to disengage the tongue from the opening; and
    (c) steering means attached to the front portion of each runner for laterally displacing the runners while maintaining them in a parallel relationship, wherein said runners bow by pivoting and sliding longitudinally with respect to the platform at the fore and aft pivot points while the sled is being steered.

2. The sled of claim 1, wherein the steering means comprises a semi-circular member pivotally mounted on the platform and having connecting rods for connecting the semi-circular member to the front portions of each runner.

* * * * *